US005563359A

United States Patent [19]
Okamura

[11] Patent Number: 5,563,359

[45] Date of Patent: Oct. 8, 1996

[54] ELECTRONIC MUSICAL INSTRUMENT SYSTEM WITH A PLURALITY OF MUSICAL INSTRUMENTS INTERCONNECTED VIA A BIDIRECTIONAL COMMUNICATION NETWORK

[75] Inventor: Yasuhiko Okamura, Hamamatsu, Japan

[73] Assignee: Yamaha Corporation, Japan

[21] Appl. No.: 217,682

[22] Filed: Mar. 25, 1994

[30] Foreign Application Priority Data

Mar. 31, 1993 [JP] Japan .................................... 5-094955

[51] Int. Cl.[6] ............................ G09B 15/04; G10H 1/06; G10H 7/00

[52] U.S. Cl. ................................ 84/600; 84/601; 84/659; 84/477.R

[58] Field of Search ............................. 84/600–602, 645, 84/622–625, 647, 659–661, 115, 477.R, 478

[56] References Cited

U.S. PATENT DOCUMENTS 4,320,683 3/1982 Whitefield ................................ 84/115
4,617,851 10/1986 Sato ..................................... 84/601 X
5,331,111 7/1994 O'Connell ................................ 84/602
5,389,729 2/1995 Hiramatsu ................................ 84/601

FOREIGN PATENT DOCUMENTS 62-129889 6/1987 Japan .

*Primary Examiner*—Stanley J. Witkowski
*Attorney, Agent, or Firm*—Graham & James LLP

[57] ABSTRACT

Plural electronic musical instruments are connected to a bidirectional communication network, and a controller is provided for each of the musical instruments for performing control such that tone control information possessed by the musical instruments can be shared between the musical instruments. A data base may further be connected to the communication network so that tone control information possessed by the data base can also be utilized in each of the musical instruments. If any of the musical instruments does not possess certain tone control information, the musical instrument is allowed to utilize the tone control information by receiving the information from another electronic musical instrument, via the communication network, which possesses the information. Further, each of the musical instruments may make an inquiry to the other musical instrument about what tone control information is possessed by the other musical instrument and, in response to the reply from the other musical instrument, display those pieces of the tone control information possessed by the other musical instrument which are utilizable in the musical instrument, so that a selection can be made from among the tone control information possessed by the other musical instrument in accordance with the displayed information.

22 Claims, 3 Drawing Sheets

ELECTRONIC MUSICAL INSTRUMENT SYSTEM WITH A PLURALITY OF MUSICAL INSTRUMENTS INTERCONNECTED VIA A BIDIRECTIONAL COMMUNICATION NETWORK

BACKGROUND OF THE INVENTION

The present invention relates to electronic musical instrument systems having a plurality of musical instruments interconnected via a communication network.

Electronic musical instruments are conventionally known which can form data on various tone colors (tone-color-related data) by editing various parameters and store the thus-formed data in a floppy disk or other suitable secondary storage device for preservation and transportation of the data. Each of the electronic musical instruments is designed to also allow an exchange of the tone-color-related data with another electronic musical instrument by means of the floppy disk or other secondary storage device storing the tone-color-related data. To exchange the tone-color-related data, the floppy disk, for example, is inserted in the other electronic musical instrument, which is then brought into a predetermined read mode for reading the tone-color-related parameters and other data from the floppy disk. But, to achieve this, the same tone generation system must be employed in the electronic musical instruments which attempt to exchange the data. Today, such a data exchange is sometimes done by interconnecting plural electronic musical instruments via the MIDI (Musical Instrument Digital Interface).

However, the prior technique as mentioned above is not satisfactory in that, in order to utilize tone-color-related data or other data formed by another electronic musical instrument, it is absolutely necessary to exchange the data via some secondary storage medium. In addition, considerable amount of human intervention is necessary for the data exchange operation, which therefore tends to be a very complex and time-consuming operation. Further, there is encountered another problem that the operator must always recognize the contents of the data stored in the individual electronic musical instruments; e.g. the operator must know in which of the musical instruments the data to be exchanged is stored.

Such a problem may be avoided by redundantly storing the same data in all the electronic musical instruments, but this approach is not preferable in that the storage areas of the musical instruments are greatly wasted. The same problem will arise even if the data exchange is performed via the MIDI in place of the secondary storage device.

SUMMARY OF THE INVENTION

It is therefore an object of the present invention to provide an electronic musical instrument system which allows tone-related data (tone control information) to be exchanged between different electronic musical instruments at high speed with utmost ease.

To achieve the above-mentioned object, an electronic musical instrument system in accordance with the present invention comprises a bidirectional communication network, plural electronic musical instruments connected to the communication network, and a control section provided for each of the plural electronic musical instruments for performing control such that tone control information possessed by each of the musical instruments can be shared between the plural musical instruments.

With the electronic musical instrument system of the invention, because the plural electronic musical instruments are connected to the bidirectional communication network, data can be freely transmitted and received between the musical instruments via the communication network. Thus, even if one of the electronic musical instruments does not possess certain tone control information, the electronic musical instrument is allowed to utilize the tone control information by receiving, via the communication network, the information from another musical instrument which possesses the information. Further, each of the musical instruments may make an inquiry to the other musical instrument about what tone control information is possessed by the other musical instrument and may, in response to the reply from the other musical instrument, display those pieces of the tone control information possessed by the other musical instrument which are also utilizable in the musical instrument, so that a selection can be made from among the tone control information possessed by the other musical instrument in accordance with the displayed information. Because of the possibility to access the other electronic musical instrument via the communication network, each of the musical instruments will only need to have a minimum current buffer memory which stores tone control information for setting or controlling the characteristics of a tone signal to be currently generated.

The electronic musical instruments connected to the communication network may be of the same function or of different functions. If the musical instruments exchanging tone control information are of the same function, the two musical instruments can jointly utilize or share the tone control information stored in each of the musical instruments. If, on the other hand, the musical instruments exchanging tone control information are of different functions, some of the tone control information stored may be shared between the two musical instruments, and others may not.

Taking this into account, it is preferable that, in the case where the tone control information is exchanged between the musical instruments of different functions, the control section perform control such that only the tone control information which can be shared between the musical instrument is exchanged and the tone control information which can not be shared is not exchanged. For instance, in such a case where the tone control information possessed by the other electronic musical instrument is displayed, this can be easily achieved by displaying only those pieces of the tone control information which are also utilizable in the musical instrument associated with the control section and allowing a selection only from among the tone control information thus displayed. With such arrangements, by only connecting the electronic musical instruments to the communication network, it is possible to execute an exchange of tone-related data (tone control information) between the musical instruments of different functions at high speed with utmost ease, without substantial human intervention and without the need for the operator to recognize the contents of the tone control information stored in each of the musical instruments. Further, because the musical instruments interconnected via the communication network need not store same data redundantly, a limited storage area can be used with maximized efficiency.

Now, the preferred embodiment of the present invention will be described in detail below with reference to the accompanying drawings.

DETAILED DESCRIPTION OF THE PREFERRED EMBODIMENT

Figure 1:
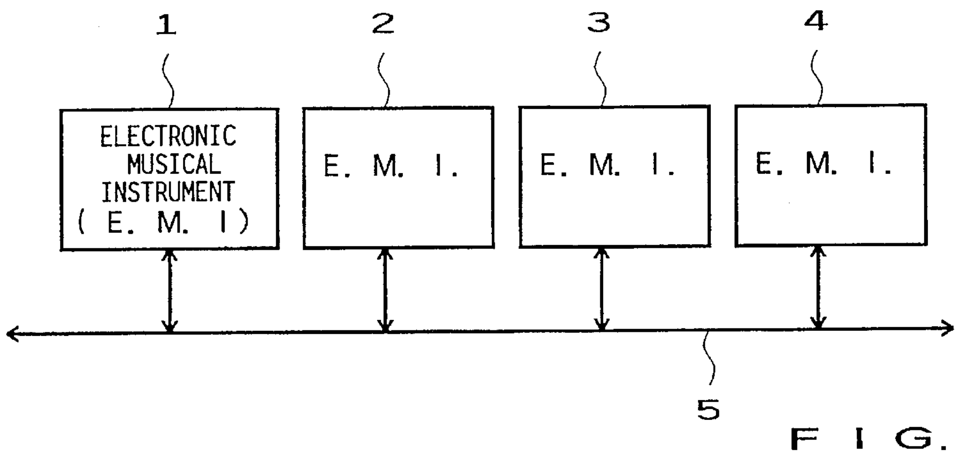
FIG. 1 is a block diagram schematically illustrating the outline of an electronic musical instrument system of the invention which comprises a plurality of electronic musical instruments connected to a communication network.

FIG. 1 is a block diagram schematically illustrating the outline of an electronic musical instrument system of the invention which comprises a plurality of electronic musical instruments connected to a bidirectional communication network.

In accordance with this embodiment, the communication network 5 is a full-duplex communication network, to which the electronic musical instruments 1 to 4 are connected in a multipoint-connection fashion. This embodiment will be described herein on the assumption that each of the electronic musical instruments 1 to 4 is a keyboard-type musical instrument where a keyboard is used to designate the pitch of each tone to be generated, although the musical instruments may be any of an electronic organ, electronic piano, synthesizer, electronic rhythm instrument, electronic wind instrument, electronic string instrument, electronic percussion instrument etc. which generate respective tones.

Each of the electronic musical instruments 1 to 4 comprises a microcomputer system which includes a microprocessor unit (CPU), a data and program memory (ROM) and a data and working RAM and which is capable of simultaneously generating plural tone signals through plural tone generation channels. If the electronic musical instrument has necessary tone-color-related data (tone control information) stored therein for specific tone signals, it generates these tone signals on the basis of the stored tone control information; if, on the other hand, the electronic musical instrument does not have such tone control information stored therein, the electronic musical instrument is allowed to generate the tone signals on the basis of information received, via the communication network 5, from any of the other musical instruments which stores the necessary tone control information.

Figure 2:
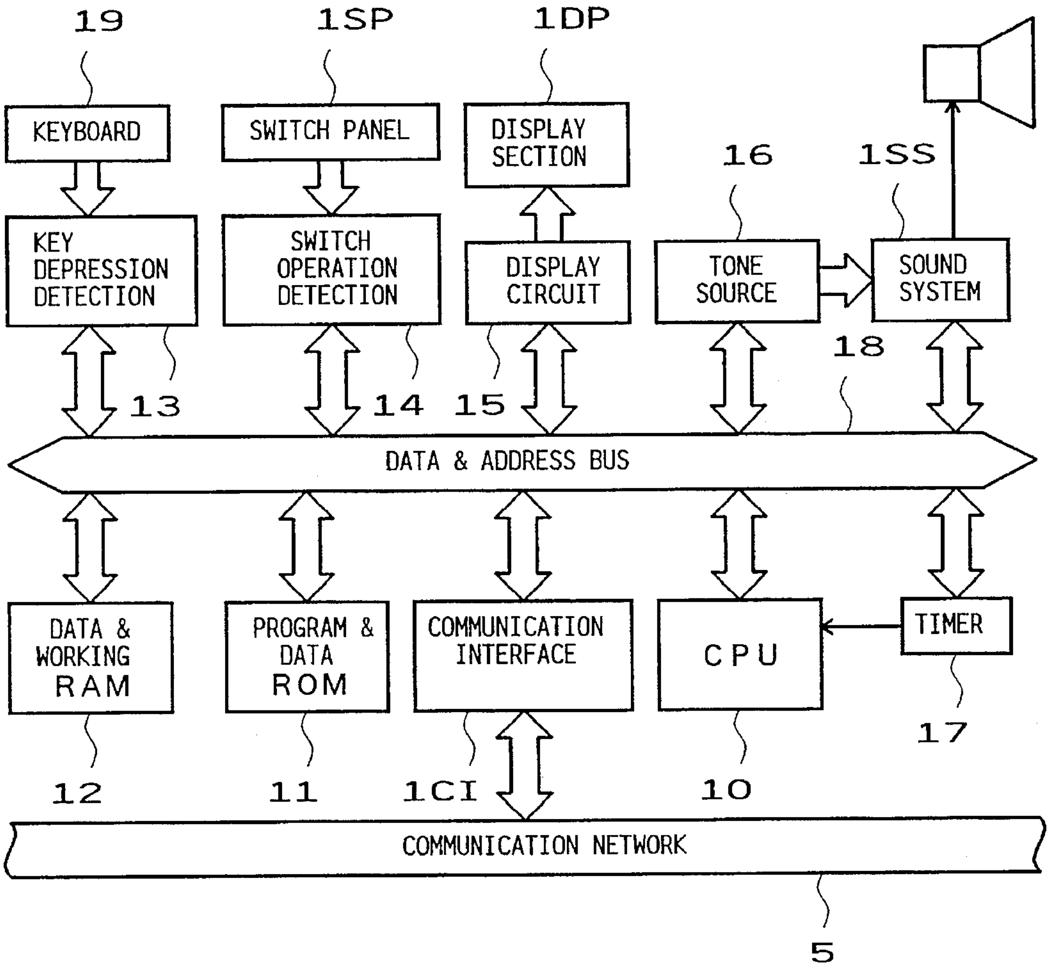
FIG. 2 is a block diagram illustrating the general hardware structure of one of the electronic musical instruments shown in FIG. 1.

FIG. 2 is a block diagram illustrating the general hardware structure in one of the electronic musical instruments. In FIG. 2, only one of the musical instruments is shown because, as earlier mentioned, the electronic musical instruments 1 to 4 in this embodiment are of the keyboard-type where the pitch of each tone to be generated is designated by a keyboard and substantially the same in basic structure. So, it should be appreciated that the illustration and following description also applies to the other musical instruments, unless specifically stated otherwise. For clarity of description, the reference characters of some components belonging to the electronic musical instrument 1 is prefixed by numeral "1", and likewise the reference characters of some components belonging to the electronic musical instruments 2 to 4 are prefixed by numerals "2", "3" and "4", respectively.

In the embodiment of FIG. 2, the entire operation of the electronic musical instrument 1 is controlled by the microcomputer system which, as previously mentioned, includes a microprocessor unit (CPU) 10, a program and data ROM 11 and a data and working RAM 12.

To the CPU 10 that controls the entire operation of the musical instrument 1 are connected, via a data and address bus 18, the program and data ROM 11, data and working RAM 12, key depression detection circuit 13, switch operation detection circuit 14, display circuit 15, tone source circuit 16, timer 17 and communication interface 1CI.

The program and data ROM 11, which is in the form of a read-only-memory, stores therein various parameters and data which relate to system programs for the CPU 10 and to tones to be generated by the musical instrument 1. The program and data ROM 11 also stores therein tone color information, tone envelope information and tone effect information which relate to the tone color, envelope and effect of tones to be generated.

The tone source circuit 16, which is capable of simultaneously generating plural tone signals through plural tone generation channels, receives various performance information (key code, key-on signal, touch data and various parameters) provided via the data and address bus 18 and generates tone signals on the basis of the received performance information in accordance with a predetermined tone signal generation system.

The tone source circuit 16 may employ any of various known tone generation systems such as a memory readout system where tone waveform sample value data (WAVEFORM DATA) stored in a waveform memory are sequentially read out by address data changing in accordance with the pitch of tone to be generated; an FM system where predetermined frequency modulation operations are performed using the above-mentioned address data as phase angle parameter data so as to obtain tone waveform sample value data (FM DATA); an AM system where predetermined amplitude modulation operations are performed using the above-mentioned address data as phase angle parameter data so as to obtain tone waveform sample value data; and a harmonic addition system using tone-generating algorithms (TONE GENE. ALGORITHM). But, in this embodiment, it is assumed that the tone source circuit 16 of each of the electronic musical instruments 1 to 4 employs a tone generation system as will be described below.

Figure 3:
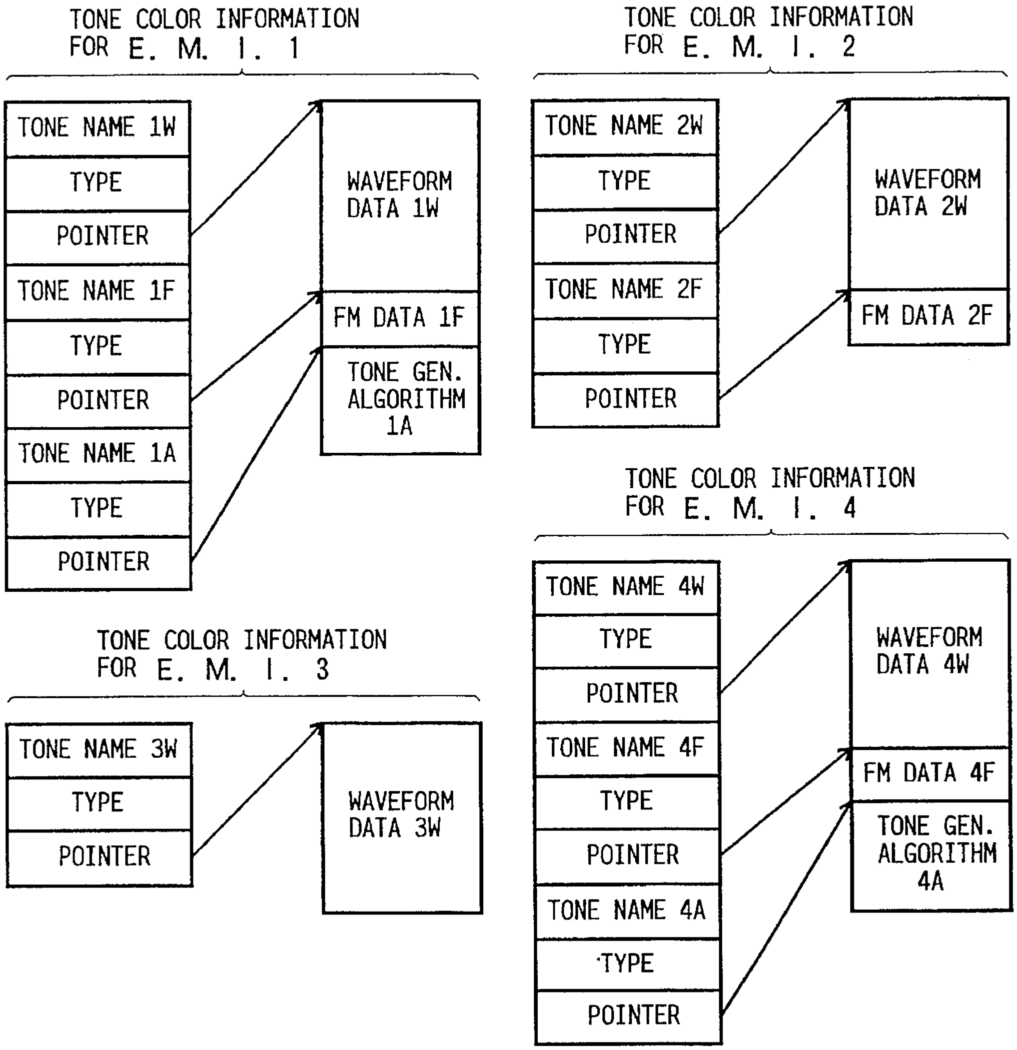
FIG. 3 is a diagram illustrating an example of tone color information stored in a program and data ROM of the electronic musical instrument shown in FIG. 1.

FIG. 3 shows an example of the tone color information, which is stored in the program and data ROM of each of the electronic musical instruments 1 to 4 and corresponds to the tone generation system employed in the corresponding tone source circuit.

The tone source circuit 16 of the electronic musical instrument 1 is designed to generate tone signals by three of the above-mentioned systems, i.e., the memory readout, FM and harmonic addition systems, and accordingly the program and data ROM 11 of the musical instrument 1 stores therein three types of tone color information, i.e., tone waveform sample value data (WAVEFORM DATA) for the memory readout system 1W, tone waveform sample value data (FM DATA) for the FM system IF and tone-generating algorithm data (TONE GEN. ALGORITHM) for the harmonic addition system 1A.

The tone source circuit of the electronic musical instrument 2 is designed to generate tone signals by two of the above-mentioned systems, i.e., the memory readout and FM systems, and thus the program and data ROM of the musical instrument 2 stores therein two types of tone color information, i.e., tone waveform sample value data for the memory readout system 2W, and tone waveform sample value data for the FM system 2F.

The tone source circuit of the electronic musical instrument 3 is designed to generate tone signals by only one of the above-mentioned systems, i.e., the memory readout system, and thus the program and data ROM of the musical instrument 2 stores therein only one type of tone color information, i.e., tone waveform sample value data for the memory readout system 3W.

Further, the tone source circuit of the electronic musical instrument 4 is designed to generate tone signals by three of the above-mentioned systems, i.e., the memory readout, FM system and harmonic addition systems, and thus the program and data ROM of the musical instrument 4 stores therein three types of tone color information, i.e., tone waveform sample value data for the memory readout system 4W, tone waveform sample value data for the FM system 4F and algorithm data (TONE GEN. ALGORITHM) for the harmonic addition system 4A.

The tone color information is composed of a header portion as shown on the 1 eft side of the figure and a data portion as shown on the right side of the figure. The header portion contains tone color name data TONE NAME, type data TYPE indicative of the type of the tone generation system employed for the tone color and pointer POINTER indicative of the storage location of the tone color data, while the data portion contains, at the location designated by the pointer POINTER, tone color data corresponding to the tone color.

The data and working RAM 12 of each of the musical instruments temporarily stores the performance information and various data produced as the CPU 10 executes the programs. The RAM 12 is provided in predetermined areas of an random access memory RAM and is used as registers and flags. In this embodiment, tone color buffer areas are also established within the data and working RAM 12 for temporarily storing the tone color information.

A keyboard 19 includes a plurality of keys for designating the pitch of tone to be generated and key switches corresponding to the keys. The keyboard 19 also includes key touch detection means. The keyboard 19 is employed in this embodiment because it is a fundamental operator for music performance which is easy to understand, but of course any other performance operator may be employed.

The key depression detection circuit 13 includes key switch circuitry provided in corresponding relation to the individual keys on the keyboard 19. Once any key is newly depressed on the keyboard 19, the detection circuit 13 outputs key-on event information including the key code of the depressed key, while once any key is released from the depressed state, the detection circuit 13 outputs key-off event information including the key code of the depression-released key. The key depression circuit 13 is also designed to detect the key depression speed or force to produce touch data and outputs the touch data as velocity data.

The display circuit 15 is provided to display, by means of a display section 1DP, various information such the current control state of the electronic musical instrument, contents of currently-set parameters and parameters settable within the associated electronic musical instrument. More specifically, the display circuit 15 displays, for example, a tone color name TONE NAME and a tone generation system TYPE corresponding to the tone name, and some parameters of the other musical instruments that can be selectively set within the associated musical instrument. Thus, by only looking at the displayed information on the display section 1DP, the player or operator can readily recognize the parameters currently set within the electronic musical instrument, and the player can readily recognize, without prior knowledge about what parameters are possessed by the individual musical instruments interconnected via the communication network 5, parameters that can be set within the associated musical instrument.

The display section 1DP typically comprises a LCD (liquid crystal display) panel whose operation is controlled by the control circuit 15.

A switch panel 1SP includes various switches or operators which are provided for selecting, setting and controlling the tone color, envelope and effect information, and it includes, for example, a tone color display selection switch for causing the types of tone colors selectable in the musical instrument to be indicated on the panel, and tone color selection switches for selecting a desired tone color.

The switch operation detection circuit 14 scans all the switches on the switch panel 1SP to detect the respective operational states (i.e., types of events) of the switches.

Tone signals generated by the tone source circuit 16 are audibly reproduced or sounded through amplifiers and speakers of a sound system 1SS. The sound system 1SS may receive tonal effect parameters to control the reverberation effect of tone to be generated. In addition, the sound system 1SS may be designed to control the other effect, volume, localization and the like of the tone under the control of the CPU 10.

The timer 17 generates clock pulses that are used for counting time intervals and for executing timer interrupt processing, and the clock pulse frequency can be set and adjusted by means of a clock setting switch (not shown) provided on the switch panel 1SP. The generated clock pulse is given to the CPU 10, upon which the CPU 10 executes a timer interrupt process.

The communication interface 1CI provides connection between the data and address bus 18 of the associated musical instrument and the communication network 5. Thus, the electronic musical instrument 1 is allowed to exchange data with the other musical instruments 2 to 4 via the communication interface 1CI and the communication network 5.

Figure 5:
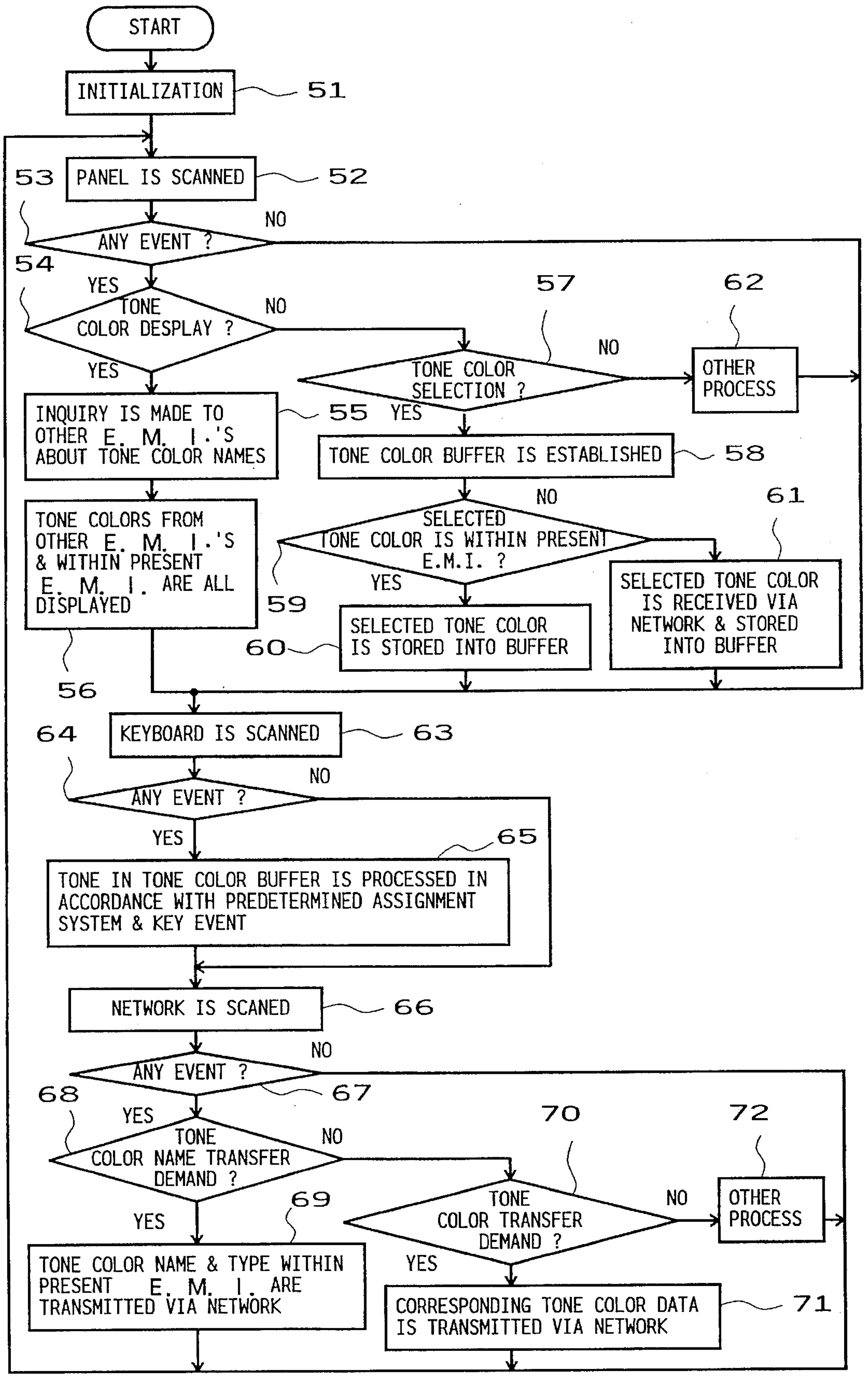
FIG. 5 is a flowchart of processing executed by the musical instruments of FIG. 1 independently of each other.

Next, description will be made below on the operational flow of each of the electronic musical instrument systems of FIG. 1, with reference to a flowchart of FIG. 5. FIG. 5 is an example of a flowchart of various processes that are carried out by the electronic musical instruments 1 to 4 independently of each other.

Step 51: Upon power-on, the CPU 10 of each of the electronic musical instruments executes a predetermined initialization process to initialize the data and working RAM, and various registers and flags.

Step 52: After the predetermined initialization, in each of the musical instrument, the switch panel 1SP is scanned to detect the respective operational states of the switches on the panel.

Step 53: On the basis of the scanned results, each of the musical instruments determines whether there is any switch event, i.e., whether any of the switched has been operated on the switch panel 1SP. If there is a switch event (YES), the present musical instrument goes to next step 54; otherwise (if the determination is NO), the musical instrument jumps to step 63.

Step 54: A determination is made as to whether the switch event detected in the preceding step 52 is that of the tone color display selection switch. If the answer is in the affirmative, the present musical instrument goes to next step 55; otherwise the musical instrument branches to step 57.

Step 55: A inquiry is made to each of the other electronic musical instruments connected to the communication network 5, about the names of tone colors stored in or possessed by the other musical instruments. Namely, for example, the electronic musical instrument 1 transmits a tone color name transfer demanding message to each of the other musical instruments 2 to 4 by way of the communication interface 1CI and communication network 5. Upon receipt of such a message from the musical instrument 1, each of the other electronic musical instruments 2 to 4 executes the process of step 69 to send tone color name data TONE NAME stored therein and type data TYPE indicative of the tone generation system for the tone color, to the transfer demand source, i.e., electronic musical instrument 1. Similar operation takes place where the transfer demand source is another electronic musical instrument 2, 3 or 4.

Step 56: On the basis of the type data TYPE transmitted from the other electronic musical instruments, the present musical instrument determines which of the tone colors can be implemented or sounded within the present musical instrument, and then the names of the tone colors from the other musical instruments which have been determined as "implementable" as well as the tone color names stored in the present musical instrument are all displayed on the display section 1DP. For instance, because, as previously mentioned, the electronic musical instrument 1 or 4 can generate tone signals by the memory readout, FM and harmonic addition systems, the musical instrument 1 or 4 displays, via the display section 1DP or 4DP, all of tone color names 1W, 1F, 1A, 2W, 2F, 3W, 4W, 4F and 4A shown in FIG. 3. Further, because the electronic musical instrument 2 can generate tone signals by the memory readout and FM systems, it displays, via the display section 2DP, tone color names 1W, 1F, 2W, 2F, 3W, 4W, 4F and 4 of those shown in FIG. 3. However, because the electronic musical instrument 3 can generate tone signals only by the memory readout system, it displays, via the display section 3DP, only tone color names 1W, 2W, 3W, 4W of those shown in FIG. 3.

Step 57: Because of the determination in the preceding step 54 that the switch event is not that of the tone color display selection switch, it is further determined whether the switch event is that of the tone color selection switch. The present musical instrument goes to next step 58 if the switch event is a tone color selection event (YES), but the musical instrument goes to step 62 if the answer is in the negative.

Step 58: In the present musical instrument, a tone color buffer area for storing tone color data is established within the data and working RAM 12.

Step 59: A determination is made as to whether the tone color selected by the tone color selection switch is one of those tone colors provided within or possessed by the present musical instrument. If the determination is YES, the musical instrument goes to next step 60, but if the tone color is from any of the other electronic musical instruments (NO), the musical instrument branches to step 61.

Step 60: Because of the determination in the preceding step 59 that the selected tone color is one of those possessed by the present musical instrument, the tone color data is loaded into a tone color buffer in the buffer area.

Step 61: Because of the determination in the preceding step 59 that the selected tone color is a tone color possessed by another electronic musical instrument, the tone color data is received from the other musical instrument via the communication network 5 and then stored directly into the tone color buffer of the present musical instrument.

Step 62: Because the switch event is other than that of the tone color display selection switch or that of the tone color selection switch, another process is executed in correspondence to the other switch event, after which the present musical instrument goes to step 63.

Step 63: The keyboard 19 is scanned to detect its operational state.

Step 64: On the basis of the scanned results in the preceding step 63, a determination is made as to whether there is any key event. If there is a key event (YES), the present musical instrument goes to next step 65; otherwise the musical instrument goes to step 66.

Step 65: In accordance with a predetermined tone assignment system and the content of the key event, a tone generation process is executed using the tone color stored in the tone color buffer, or a tone extinguishing process is executed.

Step 66: A network scan is executed to confirm whether the present musical instrument is in receipt of a message from any of the other electronic musical instruments connected to the communication network 5.

Step 67: On the basis of the network scan results obtained in the preceding step 66, it is determined whether there is a message receipt event indicating that a message has been received from any of the other electronic musical instruments. The present musical instrument goes to step 68 if the determination is in the affirmative, but, if not, the musical instrument reverts to step 52.

Step 68: Because of the determination in the preceding step 67 that there is a message receipt event, this step further determines whether the message is a tone color name transfer demand message. If it is a tone color name transfer demand name (YES), the present musical instrument goes to step 69; otherwise the musical instrument branches to step 70.

Step 69: Because of the determination in the preceding step 68 that the message from the other electronic musical instrument is a tone color name transfer message, this step, in response to the message, provides the transfer demand source with the tone color name data TONE NAME of the corresponding tone color stored within the present musical instrument and type data TYPE indicative of a tone generation system for the tone color, via the communication network 5.

Step 70: Because of the determination in the preceding step 68 that the message received from the electronic musical instrument is not a tone color name transfer demand message, the present musical instrument further determines whether the massage is a tone color transfer demand message. If the answer is in the affirmative, the present musical instrument goes to next step 71; if not, the musical instrument goes to step 72.

Step 71: Because of the determination in the preceding step 70 that the message received from the other electronic musical instrument is a tone color transfer demand message, the present musical instrument provides the transfer demand source with tone color data corresponding to the message, via the communication network 5.

Step 72: Because steps 68 and 70 have determined that the message received from the other electronic musical instrument is not a tone color name transfer demand message or tone color transfer demand message, the present musical instrument executes another process corresponding to the received message and then returns to step 52.

Figure 4:
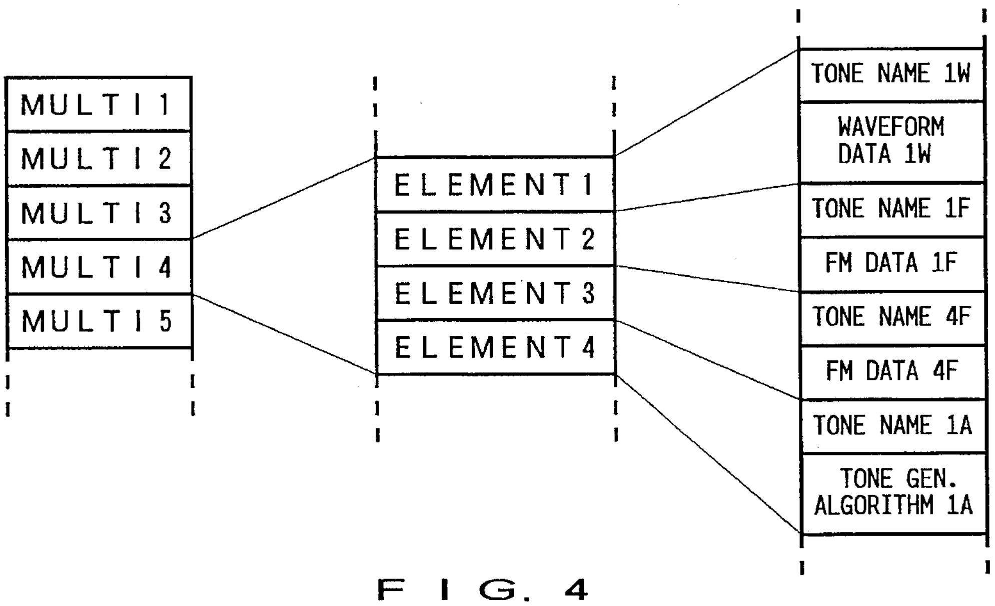
FIG. 4 is a diagram illustrating the data structure used for multiplexed tone reproduction operations performed by each of the musical instruments shown in FIG. 1.

The following case may be considered as a typical example where the electronic musical instrument 1 needs to receive tone information from any of the other electronic musical instruments. That is, as previously mentioned, the musical instrument 1 is designed to generate tone signals by the memory readout, FM and harmonic addition systems and also to execute multiplexed tone generation to generate tones of four types of tone colors in response to depression of a single key (a single key event). To this end, the musical instrument 1, as shown in FIG. 4, contains five sets of multiplexed tone generation data MULTI1 to MULTI5 with each set being composed of four types of tone color data ELEMENT1 to ELEMENT4.

For example, the fourth set of multiplexed tone generation data MULTI4 is composed of four types of tone color data ELEMENT1 to ELEMENT4 which comprise tone waveform sample value data (WAVEFORM DATA) for the memory readout system 1W, tone waveform sample value data (FM DATA) for the FM system 1F and 4F, and tone-generating algorithm data (TONE GEN. ALGORITHM) for the harmonic addition system 1A. In this example, tone color information for achieving the tone colors of tone color name data 1W, 1F and 1A is provided in the program and data ROM 11 of the musical instrument 1, while tone color information for achieving the tone color of tone color name data 4F is not provided in the program and data ROM 11 of the musical instrument 1 but only in the program and data ROM 41 of the musical instrument 4. Thus, when such a tone color is selected which utilizes the fourth set of multiplexed tone generation data MULTI4, the electronic musical instrument 1 sends the electronic musical instrument 4 a tone color transfer demand message to receive the tone color data of tone color name 4F, via the communication network 5. The received tone color data of tone color name 4F is stored into the tone color buffer in the data and working RAM 12 of the musical instrument 1, so that the tone color data can be utilized within the musical instrument 1.

As apparent from the foregoing, with the electronic musical instrument system in accordance with the embodiment, the electronic musical instruments are interconnected via the bidirectional communication network so that all the tone control information distributed along the communication network can be accessed and jointly utilized by each of the musical instruments, and this achieves a highly efficient and quick data transfer among the musical instruments.

Further, because the musical instruments can equally handle the tone control information distributed along the communication network, when the operator desires to utilize specific tone control information possessed only by another musical instrument, the operator only needs to have the information automatically read into the present musical instrument, without the need to realize which of the electronic musical instruments the tone control information belongs to.

Although the electronic musical instruments where the pitch of tone to be designated by a keyboard have been described above, the musical instruments may be of any other type.

Further, the tone generation systems employed in the electronic musical instruments may be any other systems than the above-mentioned memory readout, FM and harmonic addition systems.

Moreover, although the tone control information has been described as comprising tone color data, the control information may comprise any other type of tone-related data.

Furthermore, although the embodiment has been described above in relation to a case where the tone control information already stored within the electronic musical instruments connected to the communication network is shared among the musical instruments, an alternative arrangement may be such that a large-capacity storage medium (e.g., one or more hard disks) storing an enormous amount of tone control information is further connected to the communication network so that the individual musical instruments can freely utilize the tone control information stored in the storage medium by way of the communication network.

As has been thus far described, the present invention achieves an exchange of tone-related data (tone control information) between separate electronic musical instruments at high speed with utmost ease, by only connecting the musical instruments to a communication network.

What is claimed is:

1. An electronic musical instrument system comprising:

a bidirectional communication network;

plural electronic musical instruments connected to said communication network; and control means provided for each of said electronic musical instruments, for performing control such that tone control information possessed by each of said musical instruments can be shared between said plural musical instruments, wherein said control means of each of said musical instruments comprises:

first means for making an inquiry to each said electronic musical instrument other than said electronic musical instrument associated with said control means, about what tone control information is possessed by said other electronic musical instrument;

second means for providing a reply about the tone control information possessed by said associated electronic musical instrument, in response to the inquiry from said other electronic musical instrument, third means for displaying the tone control information possessed by said other electronic musical instrument, in accordance with the reply provided by said other electronic musical instrument; and fourth means for allowing a selection from among the tone control information possessed by said other electronic musical instrument which is displayed by said third means.

2. An electronic musical instrument system as defined in claim 1 wherein said third means displays only those pieces of the tone control information possessed by said other electronic musical instrument which are also utilizable in said associated electronic musical instrument, so that said fourth means allows a selection only from among said those pieces of the tone control information possessed by said other electronic musical instrument which are utilizable in said associated electronic musical instrument.

3. An electronic musical instrument system as defined in claim 1 wherein said fourth means allows a selection from among only those pieces of the tone control information possessed by said other electronic musical instrument and displayed by said third means which are also utilizable in said associated electronic musical instrument.

4. An electronic musical instrument system as defined in claim 1 wherein said fourth means includes means for making a selection from among the tone control information possessed by said other electronic musical instrument and displayed by said third means, and means for, when a selection is made from among the tone control information possessed by said other electronic musical instrument, making a demand for a transfer of the selected tone control information from said other electronic musical instrument and receiving the selected control information transmitted from said other electronic musical instrument in response to said demand, via said communication network, so as to allow the received tone control information to be utilized in said associated electronic musical instrument.

5. An electronic musical instrument system as defined in claim 1 wherein said fourth means includes means for making a selection from among the tone control information possessed by said other electronic musical instrument and displayed by said third means, and means for, when a selection is made from among the tone control information possessed by said other electronic musical instrument, making a demand for a transfer of the selected tone control information from said other electronic musical instrument and receiving the selected control information transmitted from said other electronic musical instrument in response to said demand, via said communication network, so as to store the received tone control information directly into a current buffer and to control characteristics of a tone signal to be currently generated in accordance with the tone control information stored in said current buffer.

6. An electronic musical instrument system as defined in claim 1 wherein said third means displays not only the tone control information possessed by said other electronic musical instrument but also the tone control information possessed by said associated electronic musical instrument.

7. An electronic musical instrument system as defined in claim 1 wherein said first means makes said inquiry by designating a type of the tone control information.

8. An electronic musical instrument system as defined in claim 1 which further comprises fifth means for, in response to the demand from said other electronic musical instrument, transmitting the tone control information possessed by said associated electronic musical instrument to said other electronic musical instrument via said communication network.

9. An electronic musical instrument system comprising:

a bidirectional communication network;

plural electronic musical instruments connected to said communication network: and control means provided for each of said electronic musical instruments, for performing control such that tone control information possessed by each of said musical instruments can be shared between said plural musical instruments, wherein each of said control means comprises:

means for making an inquiry to each said electronic musical instrument other than said electronic musical instrument associated with said control means, about what tone control information is possessed by said other electronic musical instrument;

means for displaying the tone control information possessed by said other electronic musical instrument in response to a reply from said other electronic musical instrument to the inquiry and for thereby allowing a selection from among the tone control information possessed by said other electronic musical instrument, and means responsive to the selection for accessing, via said communication network, a storage device in said other electronic musical instrument storing the tone control information, to thereby receive the selected tone control information from said other electronic musical instrument, and for storing the received tone control information directly into a current buffer, said current buffer being provided for storing tone control information to set or control characteristics of a tone signal to be currently generated.

10. An electronic musical instrument system comprising:

a bidirectional communication network;

plural electronic musical instruments connected to said communication network; and control means provided for each of said electronic musical instruments, for performing control such that tone control information possessed by each of said musical instruments can be shared between said plural musical instruments, wherein each of said control means comprises:

selection means for making a selection from among the tone control information, demand means for, if the tone control information selected by said selection means is not possessed by said electronic music instrument associated with said control means, making a demand for a transfer of the selected tone control information from said other electronic musical instruments possessing the selected tone control information, via said communication network, transmission means for transmitting the tone control information demanded by said other electronic musical instrument via said communication network, and utilization means for receiving the selected tone control information transmitted, in response to the demand by said associated electronic musical instrument, from said other electronic musical instrument via said communication network, so as to utilize the received tone control information in said associated electronic musical instrument.

11. An electronic musical instrument system as defined in claim 10 wherein said selection means can select one set from among plural sets of multiple tone colors which are provided for simultaneously generating plural different tones, and wherein, if said associated electronic musical instrument does not possess necessary tone control information for achieving any of the plural tone colors constituting the selected one set of multiple tone colors, said demand means makes a demand for a transfer of the necessary tone control information from said other electronic musical instruments possessing the tone control information.

12. An electronic musical instrument system as defined in claim 10 wherein said utilization means stores the selected tone control information transmitted from said said other electronic musical instrument via said communication network, directly into the current buffer, and said utilization means controls characteristics of a tone signal to be currently generated by the tone control information stored in the current buffer.

13. An electronic musical instrument system comprising:

a bidirectional communication network;

plural electronic musical instruments connected to said communication network; and control means provided for each of said electronic musical instruments, for performing control such that tone control information possessed by each of said musical instruments can be shared between said plural musical instruments, wherein said control means of each of said electronic musical instruments includes means for performing control such that only those pieces of the tone control information possessed by said other electronic musical instrument which are also utilizable in said electronic musical instrument associated with said control means are received by said associated electronic musical instrument.

14. An electronic musical instrument system comprising:

a bidirectional communication network;

a plurality of electronic musical instruments connected to said communication network;

a data base connected to said communication network; and control means provided for each of said electronic musical instruments, for performing control such that the tone control information possessed by each of said electronic musical instruments and said data base can be shared between said musical instruments.

15. An electronic musical instrument system as defined in claim 14 wherein said control means of each of said electronic musical instruments includes means for performing control such that only those pieces of the tone control information possessed by each said electronic musical instrument other than said electronic musical instrument associated with said control means which are also utilizable in said associated electronic musical instrument are received by said associated electronic musical instrument via said communication network.

16. A method for sharing tone control information between a plurality of electronic musical instruments, said electronic musical instruments being connected to a bidirectional communication network so as to exchange the tone control information with each other, said method comprising the steps of:

causing a specific one of said electronic musical instruments to make an inquiry to each said electronic musical instrument other than said specific electronic musical instrument, about what tone control information is possessed by said other musical instrument;

causing said other electronic musical instrument to provide said specific electronic musical instrument with a reply about the tone control information possessed by said other electronic musical instrument, in response to the inquiry from said specific electronic musical instrument, causing said specific electronic musical instrument to display the tone control information possessed by said other electronic musical instrument, in response to the reply provided by said other electronic musical instrument;

causing said specific electronic musical instrument to make a selection from among the tone control information possessed by said other electronic musical instrument on the basis of the displayed information;

in response to the selection, causing said specific electronic musical instrument to make a demand for a transfer of the selected tone control information from said other electronic musical instrument which possesses the selected tone control information;

causing said other electronic musical instrument to transmit the demanded tone control information to said specific electronic musical instrument; and causing said specific electronic musical instrument to receive the tone control information transmitted from said other electronic musical instrument for utilization of the information in said specific electronic musical instrument.

17. A method for sharing tone control information between a plurality of electronic musical instruments as defined in claim 16 wherein said step of causing said specific electronic musical instrument to display the tone control control information comprises the step of displaying only those pieces of the tone control information possessed by said other electronic musical instrument which are also utilizable in said specific electronic musical instrument, so that said step of causing said specific electronic musical instrument to make a selection allows a selection only from among said those pieces of the tone control information which are utilizable in said specific electronic musical instrument.

18. A method for sharing tone control information between a plurality of electronic musical instruments as defined in claim 16 wherein a data base for tone control information is further connected to said communication network, and each of said electronic musical instruments is allowed to access said data base via said communication network so as to utilize the tone control information possessed by said data base.

19. An electronic musical instrument system comprising:

a bidirectional communication network;

plural electronic musical instruments connected to said communication network; and control means in at least two of said musical instruments for sharing tone control information between said at least two musical instruments, wherein said control means comprises means for querying at least one other electronic musical instrument to determine tone control information possessed by said at least one other electronic musical instrument.

20. An electronic musical instrument system comprising:

a bidirectional communication network;

plural electronic musical instruments connected to said communication network; and control means in at least two of said musical instruments for sharing tone control information between said at least two musical instruments, wherein said control means comprises display means for displaying tone control information possessed by at least one other electronic musical instrument and selection means for selecting from among the tone control information displayed by said display means.

21. An electronic musical instrument connectable to a bidirectional communication network comprising:

interface means for connecting said musical instrument to said bidirectional communication network; and control means for allowing said electronic musical instrument to exchange tone control information with at least one other electronic musical instrument connected to said bidirectional communication network, wherein said control means comprises means for querying said at least one other electronic musical instrument to determine tone control information possessed by said at least one other electronic musical instrument.

22. An electronic musical instrument connectable to a bidirectional communication network comprising:

interface means for connecting said musical instrument to said bidirectional communication network; and control means for allowing said electronic musical instrument to exchange tone control information with at least one other electronic musical instrument connected to said bidirectional communication network, wherein said control means comprises display means for displaying tone control information possessed by said at least one other electronic musical instrument and selection means for selecting from among the tone control information displayed by said display means.

* * * * *